United States Patent [19]
Hüttenberger et al.

[11] Patent Number: 4,965,555
[45] Date of Patent: Oct. 23, 1990

[54] ARRANGEMENT FOR ACCURATELY INSTALLING A REPLACEABLE REED SWITCH OF A DEVICE FOR MONITORING THE LIQUID LEVEL IN A TANK

[75] Inventors: Michael Hüttenberger, Reichenbach; Wolfgang Kleineberg, Calw; Hans Schaal, Esslingen; Thomas Attinger, Stuttgart; Jürgen Dietz, Weinstadt, all of Fed. Rep. of Germany

[73] Assignee: Daimler-Benz Aktiengesellschaft, Fed. Rep. of Germany

[21] Appl. No.: 396,353

[22] Filed: Aug. 21, 1989

[30] Foreign Application Priority Data

Aug. 23, 1988 [DE] Fed. Rep. of Germany ....... 3828517

[51] Int. Cl.$^5$ ............................................. G08B 21/00
[52] U.S. Cl. .................................... 340/624; 200/84 C; 116/228; 73/314; 73/315; 340/450; 340/623
[58] Field of Search ............ 340/623, 624, 450, 450.1, 340/450.2, 450.3; 116/110, 228; 73/314, 315, 322; 200/84 C

[56] References Cited
U.S. PATENT DOCUMENTS 4,301,440 11/1981 Kubota et al. ................... 340/450.1
4,649,898 3/1987 Martinson ........................... 340/624

FOREIGN PATENT DOCUMENTS 3020462 12/1980 Fed. Rep. of Germany .
3208050 10/1982 Fed. Rep. of Germany .
3328514 2/1985 Fed. Rep. of Germany .
8703273 7/1987 Fed. Rep. of Germany .
0669932 4/1952 United Kingdom .............. 200/84 C Primary Examiner—Joseph A. Orsino
Assistant Examiner—Jill Jackson
Attorney, Agent, or Firm—Evenson, Wands, Edwards, Lenahan & McKeown

[57] ABSTRACT

In a device for monitoring the liquid level in a tank, utilizing a reed switch projecting into the tank in an internally cylindrical hollow rod and a float provided with a permanent magnet and guided on the hollow rod, the reed switch is constructed as an independent exchangeable part introducible into the hollow rod with an accurate fit and with a small assembly outlay. The slide-in part has three radially resilient abutment zones distributed uniformly around the circumference. In order to accurately introduce the slide-in part into the hollow rod, with a minimum of force, three axial guide grooves associated with the resilient abutment zones are formed radially outwards in the inner envelope surface of the hollow rod. In order to achieve the final accurate fit, the slide-in part, introduced completely into the hollow rod, is rotated until the resilient abutment zones are located in regions between the guide grooves of the hollow rod.

6 Claims, 1 Drawing Sheet

ARRANGEMENT FOR ACCURATELY INSTALLING A REPLACEABLE REED SWITCH OF A DEVICE FOR MONITORING THE LIQUID LEVEL IN A TANK

BACKGROUND AND SUMMARY OF THE INVENTION

The present invention generally relates to a device for monitoring the liquid level in a tank and more particularly to an arrangement for accurately installing a replaceable reed switch of the monitoring device.

The problem with devices for monitoring the liquid level of a tank is that the associated reed switch must be inserted with its electrical contact terminal into the interior of a hollow tube so is to fit as accurately as possible as an independent exchangeable part once securely fixed in place.

Additionally, structural measures are necessary to ensure installation of the reed switch in the correct circumferential position and also to ensure simultaneously that the electrical contacts of the reed switch are always poled in a predetermined manner when a plug is applied. Furthermore, accidental detachment of the reed switch in the installed state should be reliably prevented.

Accordingly, it is an object of the present invention to provide a device for monitoring the liquid level in a tank in which the installation and accurate fit of the exchangeably insertable reed switch is provided.

In accordance with preferred embodiments of the present invention, a centric alignment of a slide-in part, carrying the reed switch, inside the cylindrical interior of a hollow rod is ensured at all times by three resilient abutment zones distributed uniformly around the circumference of the slide-in part.

Centering bushings having a likewise resilient three-point support within a receiving bore are disclosed by German Published Unexamined Patent Application 3,328,514 AL. However, the object of these bushings is solely to keep the diameter of the bushing aperture as centric as possible and unchanged in size in the case of an inaccurately fitted or stepped receiving bore. The arrangement further permits compensation of dimensional deviations between the parts to be connected to each other, which exist relative to connecting parts to be introduced and may be cumulative.

The compensation of such dimensional deviations is not necessary in preferred embodiments of the present invention where the accurate fit on the slide-in part inside the hollow rod is realized, because the slide-in part is freely introducible into the hollow rod.

However, it is important for preferred embodiments of present invention to obtain an accurate fit of the slide-in part, free from play, utilizing the simplest possible assembly facility to provide a centric securing of the slide-in part inside the hollow rod with a firm tensioning.

Guide grooves provided inside the cylindrical inner envelope surface of the hollow rod according to one embodiment of the present invention permit a firm tensioning of the slide-in part inside the hollow rod. The guide grooves, which correspond to the number of the resilient abutment zones of the slide-in part and are distributed around the circumference in the same manner, permit an extremely convenient introduction of the slide-in part with the reed switch present inside it.

The final tensioning of the slide-in part at the resilient abutment zones only occurs in a second step after the introduction of the slide-in part into the hollow rod, by a rotation of the slide-in part The rotation causes the resilient abutment zones of the slide-in part to be located in regions circumferentially between the guide grooves of the inner envelope of the hollow rod. Due to the guide grooves, it is possible to provide a degree of tensioning of the final assembled device which would be virtually impossible during the introduction of the slide-in part into the hollow manually. The guide grooves therefore contribute to a high degree to the desired accurate and firm fit of the slide-in part inside the hollow rod which is achieved during assembly with truly simple means and the exertion of little force.

Fastening means are also provided which provide a circumferentially and radially definite secure fixing of the reed switch carrying slide-in part.

Rotational security for the slide-in part can be achieved in a very simple and absolutely reliable manner by an adaptation of the form of an electrical plug to be applied on the electrical contacts of the reed switch to a given form of the hollow rod and/or of a foot region of the slide-in part.

In the case of a tongue and groove connection by which the plug for the current to be conducted to the reed switch is anchored on the hollow rod and/or the slide-in element, a predetermined poling of the plug relative to the contacts of the reed switch can be ensured additionally by an appropriate conformation.

A bayonet fastening, by which the anchorage of the slide-in part with the reed switch inside the hollow rod is effected, can also be designed with regard to its interlacing parts so that the slide-in part is introducible into the hollow rod only in a circumferentially predetermined position.

Other objects, advantages and novel features of the present invention will become apparent from the following detailed description of the invention when considered in conjunction with the accompanying drawings.

DETAILED DESCRIPTION OF THE DRAWINGS

Figure 1:
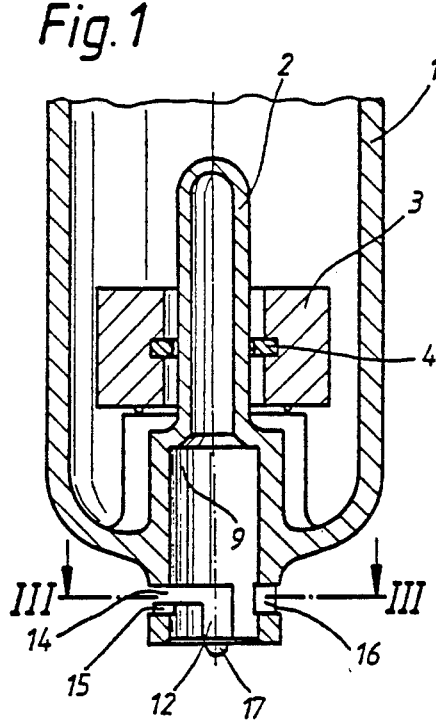
FIG. 1 is a sectional side view of a liquid level monitoring device according to one embodiment of the present invention installed in a tank, with reed switch not yet fitted.

An exemplary embodiment of the present invention is shown in the drawings and will be explained in detail below.

Figure 2:
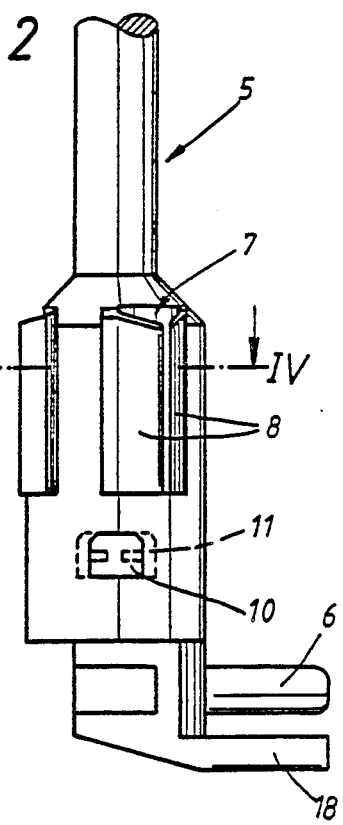
FIG. 2 shows in elevation a slide-in part containing a reed switch, not shown.
Figure 3:
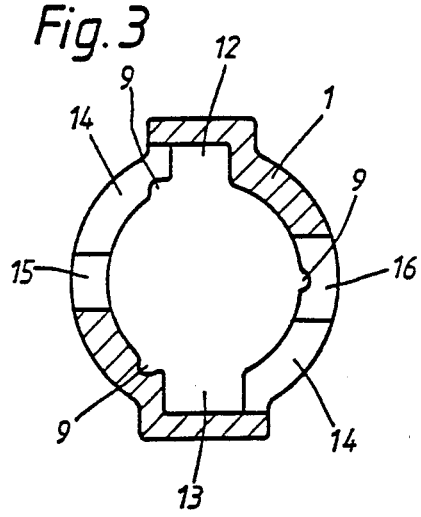
FIG. 3 is a sectional view through an entrance region of the hollow rod along Line III—III in FIG. 1.
Figure 4:
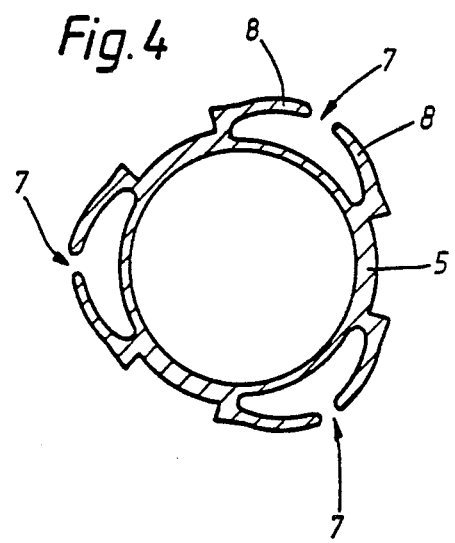
FIG. 4 is a sectional view through the slide-in part for the reed switch along Line IV—IV in FIG. 2 in a rotated position.

A hollow rod 2 is formed in the housing of a tank 1 as a guide track for a float 3. An annular permanent magnet 4 is integrated into the float 3. A slide-in part 5, shown in FIG. 2, is insertable into the hollow rod 2. The slide-in part 5 receives a reed switch, not shown in the drawing, which is operated by the permanent magnet 4 in the float 3.

When the float 3 attains a predetermined geodetically lower position, due to a corresponding liquid level in the tank 1, the reed switch trips an electrical pulse, which may be made visible by an indicator, for example. The electrical connection of the reed switch is affected through contacts 6 fitted into a foot region A of the slide-in part 5.

The fitting of the slide-in part 5 occurs with its foot region A inside the entrance region B of the hollow rod 2. The hollow rod 2 is provided internally in this region entrance B with a substantially cylindrical inner envelope surface.

In the foot region A of the slide-in part 5, which is required to be fitted into the relevant inner cylindrical entrance region B of the hollow rod 2, three resilient abutment zones 7 are provided distributed around the circumference. The resilient abutment zones 7 each consist of a pair of resilient tongues 8. The radially free ends of the tongues 8 are located in an imaginary cylindrical envelope surface, the diameter of which is greater than that of the envelope of the cylindrical entrance region B of the hollow rod 2.

Glid grooves 9, extending in the longitudinal direction of the hollow rod 2 and facing radially outwards in depth and distributed uniformly around the circumference, are provided inside the cylindrical entrance region B of the hollow rod 2 for receiving the foot region A of the slide-in part 5. The glide grooves 9 receive the three resilient abutment zones 7 of the slide-in part 5. The slide-in part 5 is slid with the resilient abutment zones 7 into the guide grooves 9 during assembly. The accurate fit of the slide-in part 5 inside the hollow rod 2 is then achieved by rotating the slide-in part 5, the slide-in part 5 being rotated so that the resilient abutment zones 7 become located in the hollow rod 2 outside the guide grooves 9. All the parts preferably are made of plastic.

Extreme accuracy of fit of the slide-in part 5 inside the hollow rod 2 is important in order to permit the region of the slide-in part 5 which is located outside the foot region A, and in which the highly sensitive reed switch is located, to be aligned in the hollow rod 2 with the smallest possible circumferentially deviation between the magnet and reed switch. High precision of fit of the arrangement of the slide-in part 5, and of the guide means of the permanent magnet 4, is necessary for correct functioning of the level indication. This applies particularly if it is desired to use the smallest possible, and therefore comparatively low-powered, permanent magnet.

The axial and circumferential fixing of the slide-in part 5 in the hollow rod 2 is effected by a type of bayonet fastening. Catch cams 10,11 for the bayonet fastening are arranged in the foot region A of the slide-in part 5. The receiving grooves for the catch cams 10 and 11 are located directly at the entrance region B of the aperture of the hollow rod 2 and are slide-in grooves 12 and 13 extending in the longitudinal direction of the hollow rod 2 having groove sections 14 aligned in a plane oriented at right angles to the longitudinal direction of the hollow rod 2.

In an embodiment of the aperture region B of the hollow rod 2 and/or of the catch cams 10,11, a step 15,16 is provided in each of the groove sections 14, the height of the groove sections 14 being extended slightly in the region of steps 15,16. As a result, when the slide-in part 5 is rotated into the fastened position inside the bayonet fastening, a slight catching effect in this position is obtained.

Final security against rotation occurs only by the application of an electrical plug, not shown, onto the contacts 6. The plug is predetermined in a position thereof relative to the contacts 6 by a tongue and groove connection. A projection 17, formed at the aperture of the hollow rod 2, acts as a tongue. A corresponding groove on the plug is associated with the projection 17. On the side opposite the groove in the plug, a tongue which is formed on the plug, engages into a positively fitting groove 18 inside the slide-in part 5 when contact is made. The tongue and groove connection described achieves security against rotation of the slide-in part 5 inside the hollow rod 2, and a prescribed poling of the plug contacts is ensured in this manner. Catch hooks provided on the plug, which engage with associated projections on the slide-in part 5, prevent any accidental detachment of the plug from the contacts 6.

The catch cams 10 and 11 and the associated slide-in grooves 12,13 have different widths circumferentially, so that a given circumferential association between slide-in part 5 and hollow rod 2 can be prescribed by design.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Device for monitoring a liquid level in a tank comprising:
    a hollow rod projecting into an inside of the tank and closed at a projecting end thereof, the hollow rod being retained in the tank at an open bottom end,
    a reed switch for insertion as a slide-in part into the hollow rod, the read switch including a holder part for retaining the read switch at an interior of the hollow rod on an inner envelope surface thereof,
    a float guided slidably and externally on the hollow rod including a permanent magnet for cooperating with the read switch,
    an electrical contact terminal coupled to the reed switch for connecting the reed switch to an electrical circuit,
    radially formed tongues provided on an outer circumference of the holder part and angled in a circumferential direction for abutting well sections of the inner envelope surface and for centering and retaining the reed switch in the hollow rod, and
    bayonet fastening means for fixing the reed switch in an axial direction;
    wherein the tongues are arranged in pairs on the circumference of the holder part, free ends of the tongues being combined in a pair and facing each other.

2. Device according to claim 1, wherein a cylindrical inner envelope of the hollow rod has guide grooves aligned in a longitudinal direction and extending radially outwards for receiving the slide-in part.

3. Device for monitoring a liquid level in a tank comprising;
    a hollow rod projecting into an inside of the tank and closed at a projecting end thereof, the hollow rod being retained in the tank at an open bottom end, a reed switch for insertion as a slide-in part into the hollow rod, the read switch including a holder part for retaining the read switch at an interior of the hollow rod on an inner envelope surface thereof, a float guided slidably and externally on the hollow rod including a permanent magnet for cooperating with the read switch, an electrical contact terminal coupled to the reed switch for connecting the reed switch to an electrical circuit, radially formed tongues provided on an outer circumference of the holder part and angled in a circumferential direction for abutting wall sections of the inner envelope surface and for centering and retaining the reed switch in the hollow rod, and bayonet fastening means for fixing the reed switch in an axial direction, wherein an electrical plug for supplying power to the contacts of the reed switch is pluggable onto the contact terminal of the slide-in part by a nonrotatable tongue and groove connection positioned between the plug and hollow rod and is securable against removal by catch fastenings engaging at least one of the slide-in part and the hollow rod.

4. Device according to claim 3, wherein a cylindrical inner envelope of the hollow rod has guide grooves aligned in a longitudinal direction and extending radially outwards for receiving the slide-in part.

5. Device for monitoring a liquid level in a tank comprising:

a hollow rod projecting into an inside of the tank and closed at a projecting end thereof, the hollow rod being retained in the tank at an open bottom end, a reed switch for insertion as a slide-in part into the hollow rod, the read switch including a holder part for retaining the read switch at an interior of the hollow rod on an inner envelope surface thereof, a float guided slidably and externally on the hollow rod including a permanent magnet for cooperating with the reed switch, an electrical contact terminal coupled to the reed switch for connecting the reed switch to an electrical circuit, radially formed tongues provided on an outer circumference of the holder part and angled in a circumferential direction for abutting wall sections of the inner envelope surface and for centering and retaining the reed switch in the hollow rod, and bayonet fastening means for fixing the reed switch in an axial direction, wherein the bayonet fastening means include tongue and groove parts, said tongue and groove parts of the bayonet fastening means having different forms which can be slid into each other only in the case of a predetermined circumferential association between slide-in part and hollow rod.

6. Device according to claim 5, wherein a cylindrical inner envelope of the hollow rod has guide grooves aligned in a longitudinal direction and extending radially outwards for receiving the slide-in part.

* * * * *